United States Patent [19]
Lo et al.

[11] Patent Number: 5,850,515
[45] Date of Patent: Dec. 15, 1998

[54] INTRUSION CONTROL IN REPEATER BASED NETWORKS

[75] Inventors: William Lo, Santa Clara; Ian S. Crayford, San Jose, both of Calif.

[73] Assignee: Advanced Micro Devices, Inc., Sunnyvale, Calif.

[21] Appl. No.: 827,675

[22] Filed: Apr. 10, 1997

Related U.S. Application Data

[63] Continuation of Ser. No. 630,732, Apr. 2, 1996, abandoned, which is a continuation of Ser. No. 405,686, Mar. 17, 1995, abandoned.

[51] Int. Cl.[6] .................................................. G06F 13/00
[52] U.S. Cl. ............................ 395/183.19; 395/182.02; 395/185.02
[58] Field of Search .................... 395/185.02, 185.01, 395/183.19, 183.01, 182.02, 182.01

[56] References Cited

U.S. PATENT DOCUMENTS

| | | | |
|---|---|---|---|
| 5,161,192 | 11/1992 | Carter et al. ............................... | 380/48 |
| 5,177,788 | 1/1993 | Schanning et al. ....................... | 380/23 |
| 5,305,385 | 4/1994 | Schanning et al. ....................... | 380/49 |
| 5,353,353 | 10/1994 | Vijeh et al. ............................... | 380/29 |
| 5,386,470 | 1/1995 | Carter et al. .............................. | 380/48 |
| 5,400,334 | 3/1995 | Hayssen .................................. | 370/85.4 |
| 5,414,694 | 5/1995 | Crayford et al. ...................... | 370/13.1 |

OTHER PUBLICATIONS

Derfler, Jr., et al., To Catch a Theif, PC Magazine, Sep. 28, 1993, at NE1.

*Primary Examiner*—Robert W. Beausoliel, Jr.
*Assistant Examiner*—Norman M. Wright
*Attorney, Agent, or Firm*—Sawyer & Associates

[57] ABSTRACT

A method and apparatus for securing a network from access by unauthorized end stations. A port in a multiport repeater can be disabled automatically upon detection of an unknown source address in a data packet. In addition, an interrupt signal is provided to the indicate the detection of an intruder. Further, the disabling of the port can be done substantially immediately to interrupt the re-transmission of a single packet. Alternatively, the disabling of a port can be done programmably after a predetermined number of intruder packets have been detected, or after the verification of packet integrity.

32 Claims, 4 Drawing Sheets

INTRUSION CONTROL IN REPEATER BASED NETWORKS

This application is a continuation of application Ser. No. 08/630,732 filed on Apr. 2, 1996, now abandoned, Which is a File-Wrapper Continuation of Ser. No. 08/405,686 filed on Mar. 17, 1995, now abandoned.

FIELD OF THE INVENTION

The present invention relates generally to intrusion control within a local area network and more particularly to intrusion control within a network that utilizes Multiport Repeaters.

CROSS REFERENCE TO RELATED APPLICATIONS

"Expandable Repeater" (Vijeh, Staab), U.S. Pat. No. 5,265,123.

"Address Tracking over Repeater Based Networks" (Crayford, Vijeh, Lo), U.S. patent application Ser. No. 08/019,926 filed Feb. 19, 1993.

"Repeater Security System" (Vijeh, Lo), U.S. Pat. No. 5,353,353 issued Oct. 4, 1994.

"Programmable Address Mapping Matrix for Secure Networks" (Lo, Crayford), U.S. patent application Ser. No. 08/366,809 filed Dec. 30, 1994.

"Programmable Delay of Disrupt for Secure Networks" (Lo, Crayford), U.S. patent application Ser. No. 08/366,808 filed Dec. 30, 1994.

"Programmable Disrupt of Multicast Packets for Secure Networks" (Lo, Crayford), U.S. patent application Ser. No. 08/366,806 filed Dec. 30, 1994.

"Multiple Address Security Architecture" (Lo, Crayford), Ser. No. 08/460,319, filed Jun. 2, 1995.

"Inverse Packet Disrupt for Secure Networks" (Crayford, Lo), Ser. No. 08/406,082, filed on even date herewith.

BACKGROUND OF THE INVENTION

In traditional Ethernet (802.3 10BASE5) and Cheapernet (802.3 10BASE2) a coaxial cable provides the linear bus to which all nodes are connected. Signalling is achieved using a current sink technique with a center conductor used for the signal and a shield used as a ground reference. All devices are connected to the coaxial bus, and therefore all devices will receive the transmission of a single device. Twisted pair Ethernet (802.3 10BASE-T) utilizes standard voice grade telephone cable, employing differential signalling on separate transmit and receive pairs of the cables. 10BASE-T provides only a point-to-point communication capability and requires additional active elements, e.g., a repeater, to provide a point-to-multipoint local area network (LAN) capability. An Ethernet network system typically includes a number of interconnected cable segments. A repeater is used to interconnect two or more cable segments. Each cable segment may be one of a variety of cable types, for example, coaxial or twisted pair. The repeater performs signal amplitude and timing restoration on an incoming bitstream and repeats the bitstream to all of the ports connected to the repeater. By repeating data to all ports, the repeater acts as a logical coaxial cable so that any node connected to the network will see another node's transmission.

Traditionally, repeaters allow wired coaxial Ethernet to extend a network's physical distance limit. For twisted pair Ethernet, if more than two nodes are required to provide connectivity, the IEEE 802.3 10BASE-T Standard mandates the use of a repeater. Although the physical signalling on the coaxial and twisted pair cabling differs, the functionality of the repeater for either is identical as is the frame or packet format used to pass messages through the repeater between the participating nodes on the network.

FIGS. 1 and 2 show the format for an IEEE 802.3 Standard compliant packet and an Ethernet packet, respectively. The packet commences with a preamble sequence which is an alternating (1,0) pattern. The preamble provides a single frequency on the network, in this case 5 Mega Hertz (MHz) at the start of each frame, which allows a receiver to lock to the incoming bitstream. The preamble sequence is then followed by a start of frame indicating that the data portion of the message will follow. Either a start of frame delimiter (802.3) or synch sequence (Ethernet) is used to delineate the start of the data portion of the message. A primary difference as shown is the start of frame delimiter (SFD). For 802.3, the SFD is defined as a byte that has a "1,0, 1,0, 1,0, 1,1" pattern whereas the start frame (synch) of Ethernet is a "1,1" sequence. However, in both cases the preamble plus the start of frame indication is a total of 64 bits long.

Regarding packet size, both 802.3 and Ethernet standards specify that a packet must be in the range of 64–1518 bytes. However, the actual data field in the 802.3 system is permitted to be smaller than the 46 byte value that ensures a minimum packet size. The Media Access Control sub-layer appends pad characters to a Logical Link Control (LLC) data field before sending data over the network to compensate for a smaller data field. The Ethernet standard assumes that the upper layer ensures that the minimum data field is 46 bytes before passing data to a Media Access Control (MAC) sublayer and the existence of these appended characters is unknown to the MAC device.

The 802.3 standard also uses a length field which indicates the number of data bytes that are in the LLC data and pad fields only. The high order byte of the length field is transmitted first with the least significant bit (LSB) of each byte transmitted first. Ethernet, on the other hand, uses a type field in the same two bytes of the frame to identify the message protocol type.

The data field contains the actual packet data that is being transferred and is between 46 to 1500 bytes in length. Since valid Ethernet type fields are always assigned outside of the valid maximum 802.3 packet length size, both 802.3 and Ethernet packets can coexist on the same network.

The LLC function fragments data into block sizes suitable for transmission over the network. Data bytes are transmitted sequentially with the LSB of each byte transmitted first. Following the LLC data/pad fields, the frame check sequence (FCS) is a four-byte field that contains the cyclic redundancy check (CRC) for the entire frame. The CRC is computed by the transmitting station on the destination address, source address, length/type, and data field and is appended as the last four bytes of the frame. The same CRC algorithm is used by the receiving station to compute the CRC value for the frame as it is received. The value computed at the receiver is compared with the value appended by the transmit station to provide an error detection mechanism for corrupted data. The CRC bits within the FCS are transmitted in the order most significant bit to least significant bit.

Two other fields of the frame are the destination address (DA) and the source address (SA) for the frame. Both addresses are 48 bit values transmitted LSB first. A receiving MAC determines if a match exists between the receiver's node address and the address within the DA field. Only a node indicated as matching should attempt to receive the remainder of the packet.

Three types of destination addressing are supported by the 802.3 and Ethernet standards.

1. Individual. The DA field contains an individual and unique address assigned to one node on the network.

2. Multicast. If the first bit of the DA field is set this indicates that the group address is being used. The group of nodes that will be addressed is determined by a higher layer function but in general the intent is to transmit a message between a logically similar subset of nodes on the network.

3. Broadcast. The broadcast is a special form of multicast address where the DA field is set to all is. The address is reserved, and all nodes on the network must be capable of receiving a broadcast message.

The source address field is supplied by the transmitting MAC. The transmitting MAC inserts a sender's node address into the SA field as the frame is transmitted to indicate the node as the originating station of the packet. The receiving MAC is not required to take action based on the SA field.

As mentioned above, the repeater in a network repeats data to all nodes on a network. Although data should only be received by the individual destination node addressed in the data packet, unauthorized end stations can imitate a node on a network to receive data subversively. Imitating a node can be accomplished by connecting an unauthorized end station onto a network, listening to data traffic to determine valid node addresses, and pretending to be a valid address on the network. There exists a need to ensure that an unauthorized end station in a multiport repeater-based network does not connect onto the network. Accordingly, a further need exists to prevent reception of data transmitted from an unauthorized end station by an authorized end station. The present invention addresses these needs.

SUMMARY OF THE INVENTION

The present invention provides a method and apparatus for detecting and preventing intrusion of unauthorized end stations on a network. The present invention utilizes a comparison between a source address of an incoming data packet and stored end station addresses for the network to disable an unauthorized end station from participating in the network.

In one aspect of the present invention, a method for securing a local area network includes the steps of receiving a data packet including a source address, comparing the source address to one or more end station addresses, and disabling a receive port based on the comparison between the source address and the end station addresses for the node.

In one embodiment of the present invention, the port is disabled during the re-transmission of the data packet upon the determination of a mismatch between the source address and all valid end station addresses for the receive port. In another embodiment, the disabling of a port occurs after determining of a mismatch and a predetermined number of packets have been transmitted from the source node. In a further embodiment, the disabling of a port occurs after determination of a mismatch and the integrity or validity of the packet is verified.

In another aspect of the present invention, an apparatus for controlling intrusion of a network includes a controller.

The apparatus further includes a memory comparison circuit. The memory comparison circuit operates to store end station addresses for each node and compare these stored addresses to a source address of a received data packet. An intrusion control unit coupled to the memory comparator disables a receive port when the source address received and all of the valid end station addresses for the receive port do not match.

In a further aspect of the present invention, the intrusion control unit includes an address control unit. The address control unit is configured to output a signal indicative of the end station addresses that are used for comparison purposes to disable a port.

With the method and apparatus of the present invention, a network can be secured from unauthorized end stations. A port in a multiport repeater can be disabled automatically upon detection of an unknown source address in a data packet. In addition, an interrupt signal is provided upon detection of an intruder.

Further, the disabling of the port can be done during the transmission of a single packet or any other predetermined delay into the packet. Also, the packet could be corrupted at the input port so it is re-transmitted incorrectly. Alternatively, the disabling of a port can be done programmably after a predetermined number of intruder packets have been detected. Also, the present invention provides the ability to control the disabling of the ports on a port-by-port basis. Controlling the disablement of the ports on a port-by-port basis allows data to be transmitted uninterrupted when necessary, such as when one port is linked directly to another port on a second repeater.

In addition, the present invention allows an intruder source address to be saved. Saving the intruder source address can provide the opportunity to perform higher level system monitoring to determine more sophisticated intrusion techniques, for example.

These and other advantage of the present invention will be readily apparent from the following discussion of the present invention.

DETAILED DESCRIPTION OF THE INVENTION

The present invention is directed toward a system for performing comparisons with node addresses connected to repeater ports. The following description is presented to enable one of ordinary skill in the art to make and use the invention and is provided in the context of a patent application and its requirements. Various modifications to the preferred embodiment and the generic principles and features described herein will be readily apparent to those skilled in the art.

The system as described allows the source address of an incoming packet to be monitored and compared with an internally stored value. The internal value is either programmed by the user through a microprocessor interface or by simply learning and storing the source address of the previous packet transmitted from the node. The present invention takes to advantage that the last source address indicates the source address of the last packet received on the port. If the source address changes, this indicates the sending station connected to the port either changed or that multiple nodes are connected to that port. For a multi-drop segment, the source address may change many times as different stations transmit over the network. Accordingly, the present invention provides storage for both a last source address and a preferred source address for a node to better accommodate stations that have multiple addresses. In an additional embodiment, preferred source addresses are suitably added to better support multi-drop segments having several addresses.

Using a last source address and a preferred source address, the present invention determines if a mismatch occurs between the stored addresses and a source address for a current packet. For example, a mismatch could occur due to an unauthorized attempt to access the network. Consequently, the present invention provides a control circuit that can isolate a port from the network to disable receipt and retransmission of the packet and also can provide an interrupt that informs the host processor that the source address on the port is invalid.

Figure 1:
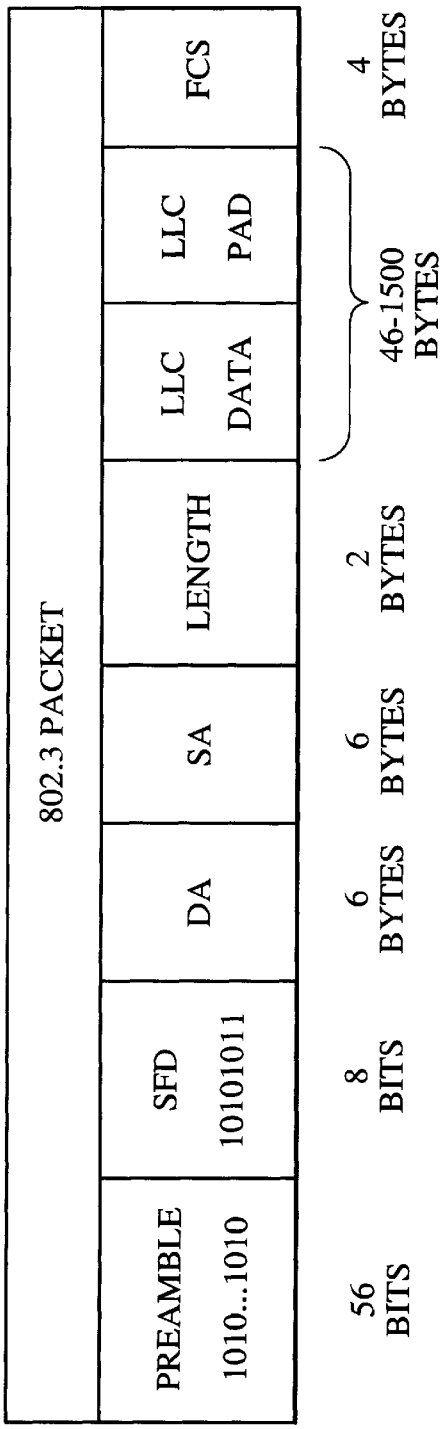
FIG. 1 shows the format for an 802.3 packet.
Figure 2:
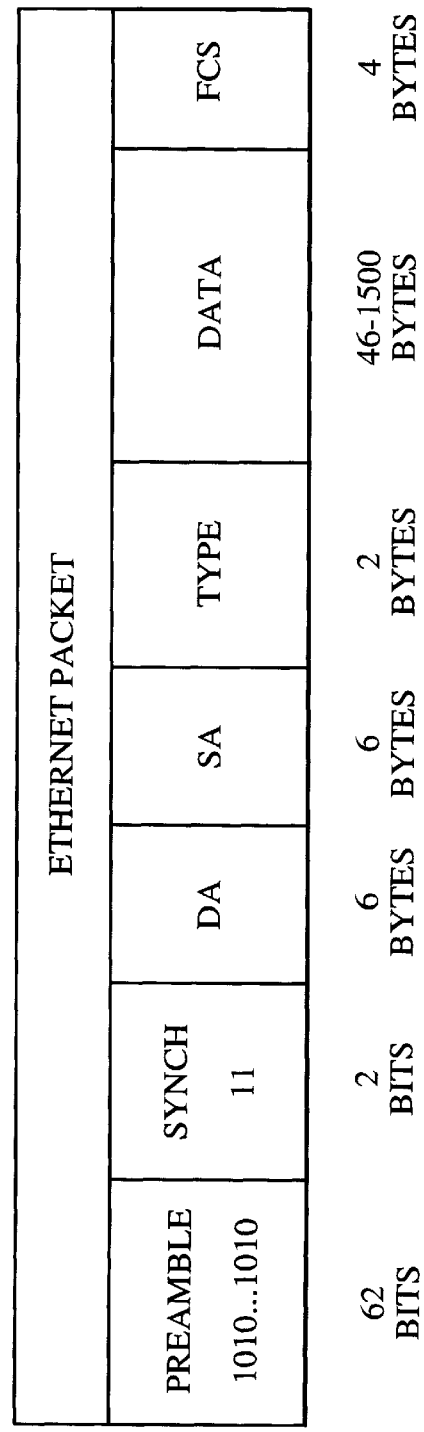
FIG. 2 is a frame format for an Ethernet packet.
Figure 3:
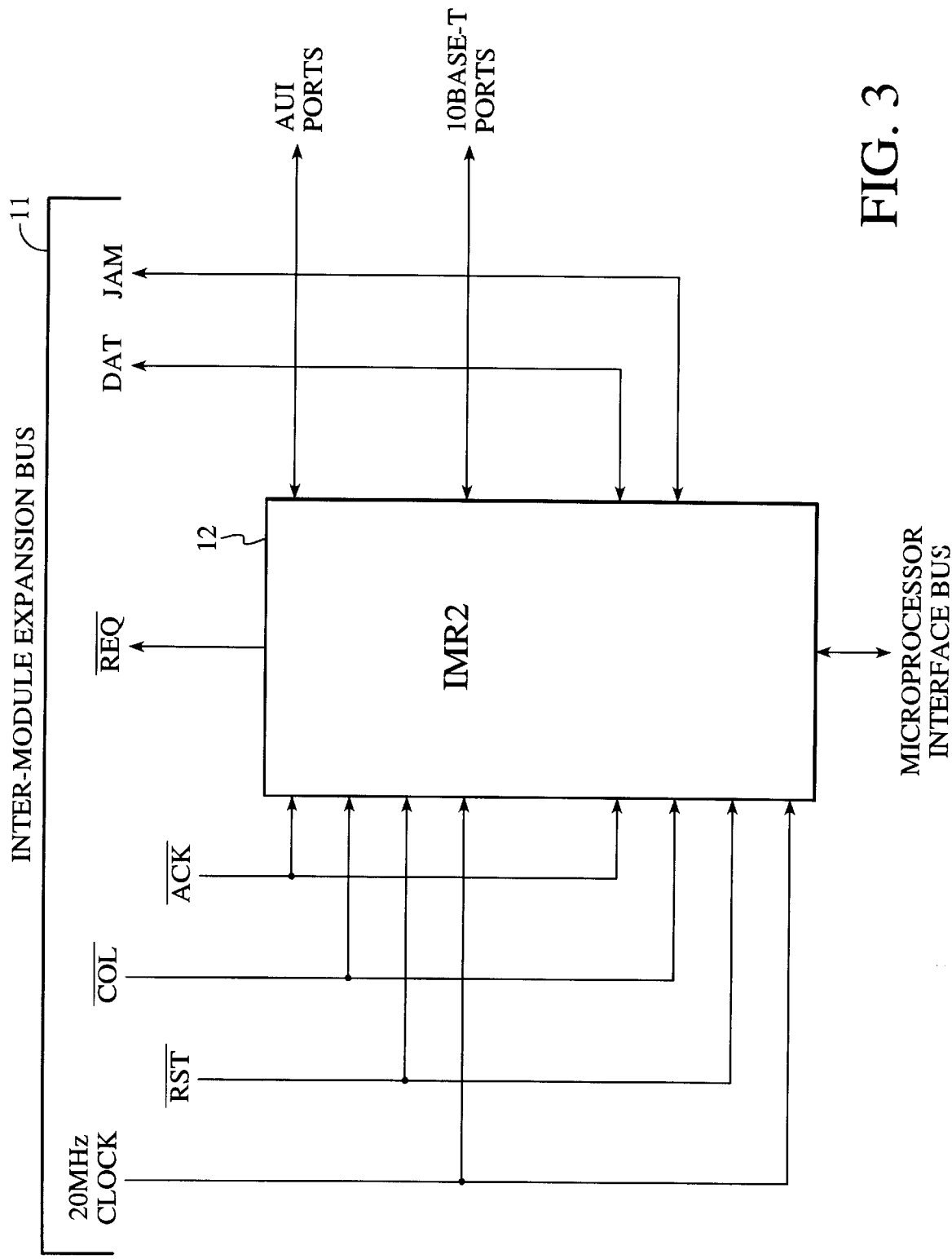
FIG. 3 is a simplified block diagram of an Integrated Multiport Repeater (IMR2) in accordance with the present invention.

Referring now to FIG. 3, the present invention comprises an Integrated Multiport Repeater (IMR2) device 12 in a preferred embodiment. The IMR2 device provides the basic repeater function, performing signal amplitude and timing restoration, incorporating individual 10BASE-T ports, and Attachment Unit Interface (AUI) ports. The AUI ports allow connection of the 10BASE-T ports to an existing coaxial wired Ethernet/Cheapernet network. The IMR2 device also provides an inter-module expansion bus 11, which allows multiple IMR2 devices to be cascaded together, and still be treated as a single repeater.

The inter-module expansion bus 11 comprises the signals $\overline{RST}$ (Reset), 20 MHz clk (20 MHz clock), $\overline{REQ}$ (Request), $\overline{ACK}$ (Acknowledge), $\overline{COL}$ (Collision), DAT (Data) and JAM (Jam). The operation of this type of expansion scheme is described in U.S. Pat. No. 5,265,123, entitled Expandable Repeater and assigned to the assignee of the present application.

Note that the data passed across this expansion bus on the DAT line is a restored version of the incoming packet data received when a single port of the IMR2 device (or group of devices) is active. This means that the preamble field of the packet which is passed across the DAT pin is restored, substantially reducing or eliminating preamble shrinkage effects due to the start up delays of the receive circuits.

In addition, the IMR2 device 12 also has a management port, to allow configuration and monitoring of the operational state of the repeater.

The IMR2 12 device further provides monitoring for all network activity detected by the IMR2 device. The IMR2 12 collects statistics based on the type of network activity, and stores this information internally as registers which can be accessed by an external host device, such as a microprocessor using the management port. The host typically uses the data collected and stored by the IMR2 12 device to provide network management information, in order to more easily administer the operation and/or fault diagnosis of the network.

The IMR2 12 provides the advantages above described. The following discussion more fully presents the operation of the device. The sizes of the various devices and signals in the following are arbitrary and one of ordinary skill in the art will recognize that many other combinations could be used and still be within the spirit and scope of the present invention. For purposes of illustration, the device sizes discussed throughout are based on an IMR2 having 16 repeater ports with each port having up to two end station addresses associated with it.

Figure 4:
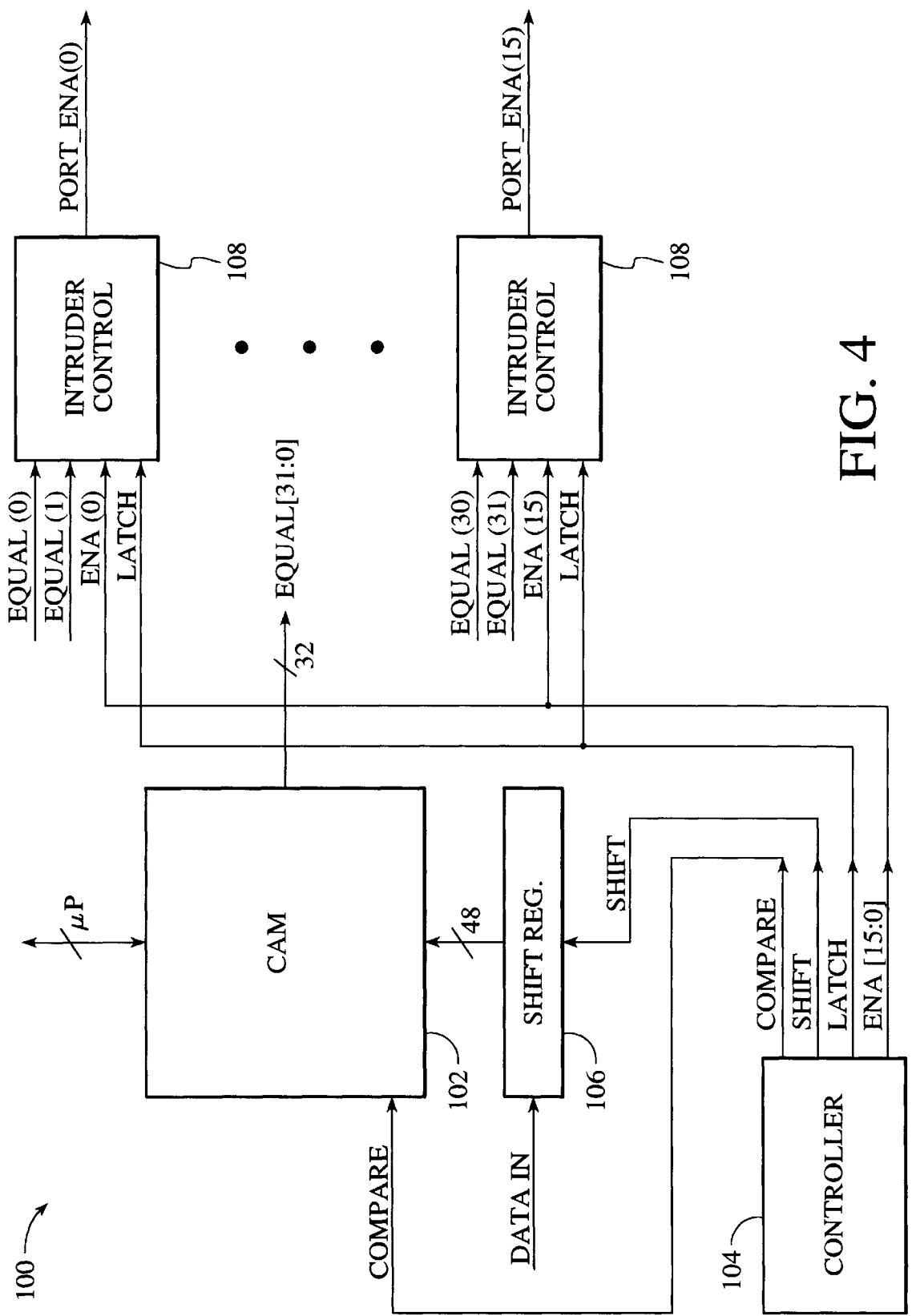
FIG. 4 is a block diagram of a network security circuit in accordance with the present invention.

FIG. 4 is an overall block diagram of a network security circuit 100 in the IMR2 device 12 in accordance with the present invention. The circuit 100 comprises a memory comparator circuit (CAM) 102 coupled to a controller 104, a shift register 106, and a plurality of intrusion control circuits 108 (one intrusion control circuit per repeater port). The CAM 102 preferably includes at least 32 storage locations, e.g., two locations for each port, with each storage location at least 48 bits wide. The CAM 102 also preferably includes a typical comparator circuit for comparing the data stored with the source address in the shift register.

The shift register 106 receives a DATA IN signal with the source address received in a data packet at any one of the repeater ports. The source address is shifted into the shift register 106 one bit at a time upon assertion of the SHIFT control signal into the shift register 106 by the controller 104. When the 48 bit source address has been fully shifted in, the controller 104 asserts a COMPARE signal into the CAM 102. The source address in the shift register 106 is then compared in the comparator circuit with the end station addresses stored in the CAM, as will be well understood by those skilled in the art.

The use of a memory circuit in size large enough to hold two end station addresses allows a last source address and a preferred source address to be stored for each port. In this way, even if the last source address changes for a node, a comparison match with a preferred source address will maintain enablement of the port. For example, if a port is connected to a node on a network having both a printer and a workstation, the last source address will change every time the printer and workstation exchange information. However, the port should not be disabled under these circumstances, and additional programming restrictions on the stored addresses may be required as explained below.

With the use of two registers in the CAM 102 in accordance with the present invention to store a last source address and a preferred source address, a last source address could change on a port without causing the port to be disabled. The change of address will still be identified by a mismatch signal from the comparator, but the intrusion control circuitry of the present invention prevents the port from being disabled by the mismatch only. Of course, in the above example having a printer and a workstation connected to a single node, the possibility exists that the preferred source address and last source address may be equal. For example, when the preferred source address is the workstation address, and the source address in the last sent data packet, i.e., the last source address, is the workstation address, the source address for the printer would no longer be valid for that node and incorrectly cause the port to be disabled. Preferably, the last source address and preferred source address can be "learned" or programmed by the controller 104 for the CAM 102. Of course, programming of the memory can be enabled permanently, on a one-time basis, or never, depending on the needs of the system.

Further, providing registers for a last source address and a preferred source address allows the source address of an intruder packet to be stored in the last source address without losing a preferred source address for a node. Storing the intruder packet source address further allows possible analysis routines to be performed to determine if a same source address is transmitting more than one intruder packet. Storing the intruder packet source address also allows a node with two addresses to be used. For instance, in some network systems, an initial address is used during "boot" time (stored in preferred address), then the station is given another network address, which is then programmed into the LSA.

Once the comparison is completed, the CAM 102 outputs an EQUAL signal. A 32 bit EQUAL signal has been found by the inventors to be suitable for a 16 port repeater having up to two end stations addresses associated with each port in accordance with the present invention. Each set of two bits in the EQUAL signal suitably represents the results of the address comparisons for each port in the repeater. For example, the lowest bit pair of the signal, bits 0 and 1, would represent the results of the address comparison for the first port, port 0. With this example, bit 0 represents the results of the comparison between a first stored address of the source node and the current source address in the packet, while bit 1 represents the results of the comparison between a second stored source address and the current source address. The successive bit pairs in the signal would represent the results for the successive ports up to the highest bit pair, bits 30 and 31, which would represent the results for the last port, port 15, of the repeater.

Accordingly, each bit in the EQUAL signal represents a match or mismatch between the source address in a current packet to the end station addresses stored for the source node. A '1' or high bit in the EQUAL signal represents a match between the current source address and a stored address, while a '0' or low bit represents a mismatch between the addresses. The EQUAL signal is then preferably output to the intrusion control circuits 108 to enable or disable a receive port in accordance with the results of the comparison and disable retransmission from any other ports.

In addition to the two bits from the EQUAL signal, the intrusion control circuits 108 also preferably receive an individual one-bit enable (ENA) signal and a global one-bit LATCH signal from the controller 104. One intrusion control circuit 108 is preferably used for each port in the IMR2. The intrusion control circuits 108 function to output a one-bit port enable signal (PORT_ENA) to enable or disable the operation of the port corresponding to each control circuit. The details of intrusion control circuits 108 are presented in greater detail in FIG. 5, in which the (X) designation in the signal references in the circuit represents a port number, e.g. 0–15.

Figure 5:
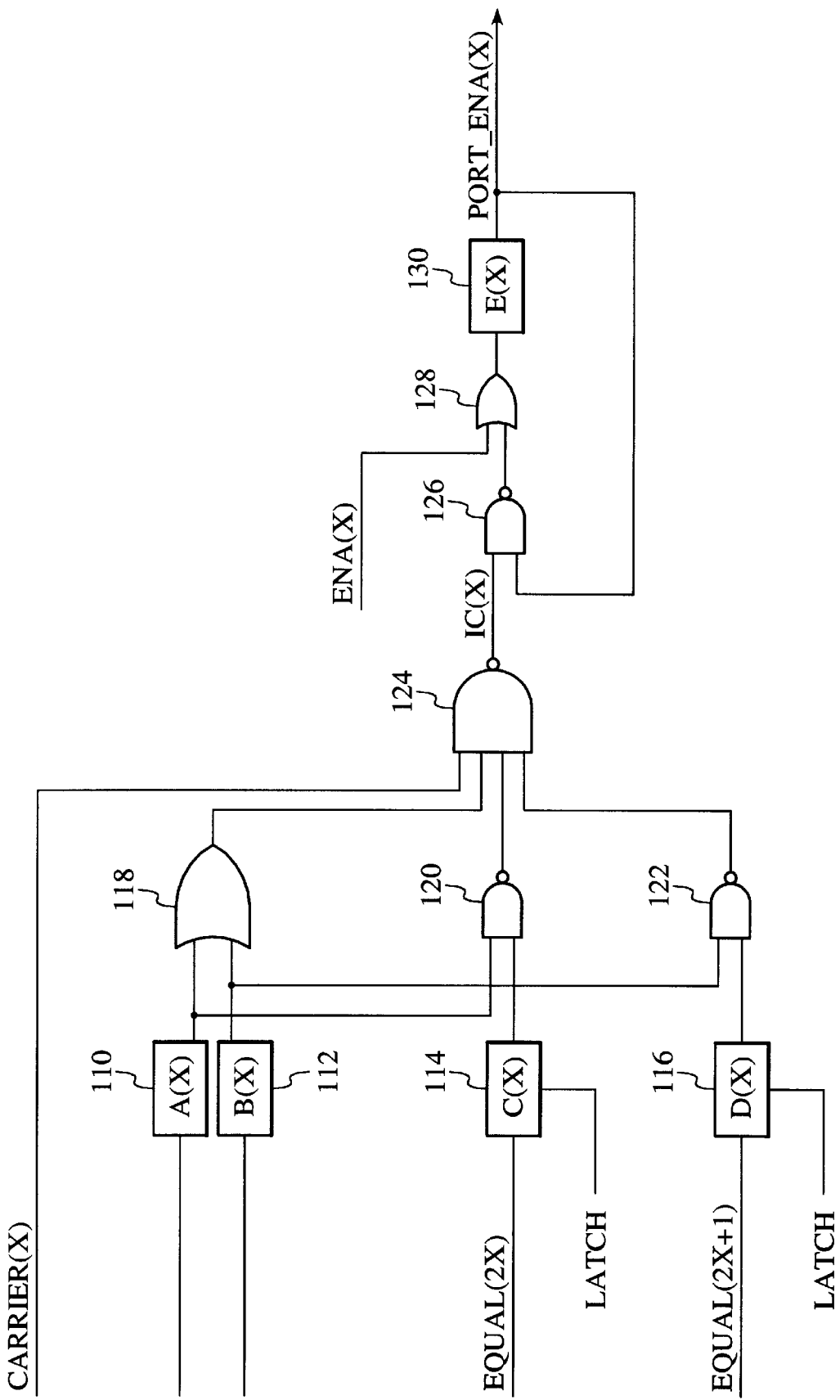
FIG. 5 is a circuit diagram for one embodiment of the intrusion control circuit of FIG. 4 in accordance with the present invention.

As shown in FIG. 5, the intrusion control circuit 108 includes latches 110, 112, 114, and 116. The outputs of latches 110 and 112 are coupled to the inputs of OR gate 118. The output of latch 110 is further coupled to one input of NAND gate 120, while the output of latch 112 is further coupled to one input of NAND gate 122. A second input of NAND gate 120 is coupled to an output of latch 114, while a second input of NAND gate 122 is coupled to an output of latch 116.

The output of OR gate 118, NAND gate 120, and NAND gate 122 are coupled to the inputs of a NAND gate 124. The NAND gate 124 also receives a CARRIER signal from the controller on a fourth input. The NAND gate 124 outputs a signal IC that is coupled to one input of AND gate 126 while the PORT_ENA signal is coupled to a second input of AND gate 126. The output of AND gate 126 and an ENA signal from the controller are input to the inputs of an OR gate 128. The output of OR gate 128 is input to a flip-flop 130, and the flip-flop outputs the PORT_ENA signal.

Each latch 114 and 116 receives one of the two bits output for the port on the EQUAL signal from the CAM 102. A first bit, e.g. bit 0, of the EQUAL signal, is latched into the latch 114, while a second bit, e.g. bit 1, of the EQUAL signal is latched into latch 116 when the LATCH signal from the controller is asserted. The LATCH signal is preferably asserted once the comparison is completed in the CAM 102.

Latches 110 and 112 provide a suitable address control mechanism or circuit for disabling ports on a port-by-port basis. Each latch 110 and 112 preferably receives a low or high bit as a signal from the controller to indicate which of the addresses associated with the port are to be used to control port disablement by the intrusion control circuit 108. Two low bits into latches 110 and 112 indicate that a port should not be disabled. A high bit in latch 110 with a low bit in latch 112 indicates that the port should be disabled only when the current source address does not match a first address associated with the port stored in CAM 102. A low bit in latch 110 with a high bit in latch 112 indicates that the port should only be disabled when the current source address does not match a second address associated with the port in the CAM 102. A high bit in both latches 110 and 112 indicates that the port should be disabled when the current source address does not match both the first and second addresses associated with the port.

The ability to isolate specific addresses within a port allows greater network control. As an example, a port on one multiport repeater which is connected to a port on another multiport repeater would observe many changes in a source address of the receive port and would preferably not be isolated at any time, so that network traffic between the repeaters would be uninterrupted. As described above, the latches 110 and 112 would suitably receive the two low bits to keep the port enabled. The use of latches 110 and 112 thus allows the intrusion control circuit to be enabled on a port-by-port basis for each port in the multiport repeater. Clearly, additional stored address locations and enable/disable latches can be added to the preferred embodiment in order to allow multiple source addresses to be compared with the received source address, dependent on the preferred circuit density.

With regard to the CARRIER signal, the CARRIER signal is normally low and is asserted high for one cycle when the packet is received on the port. Preferably, the earliest the CARRIER signal pulses high is immediately after the source address is loaded into the shift register 106, the comparison is done in the CAM 102, and the EQUAL signal is latched into latches 114 and 116. The assertion of the CARRIER signal should occur only for the port receiving the packet. The CARRIER signal for all other ports should remain low. By keeping the signal on CARRIER low until the comparison is completed, the IC signal is forced high until the comparison is completed, thus assuring that port disablement occurs after the comparison is completed.

Once the CARRIER signal asserts high, the IC signal is pulled low if there are also high signals transmitted from OR gate 118 and NAND gates 120 and 122. The high signals from OR gate 118 and NAND gates 120 and 122 indicate that the port can be disabled and that there is a mismatch between the current source address and at least one of the stored end station addresses for the port. The deassertion or pulling low of the IC signal causes the port to be disabled or shut off in the middle of the unauthorized packet. Optionally, it may be considered desirable to merely corrupt the data from the received port, as it is forwarded to the internals of the repeater, such that all output ports retransmit a corrupted packet. In this case, the PORT_ENA signal can be used to merely select the normal received packet, or select a modified (corrupted) packet in its place.

Alternatively, the controller can be implemented to delay assertion of the CARRIER signal until the end of the packet. Although delaying the assertion delays the disabling of the port and allows one packet to be received from the port, the delay allows the packet to be analyzed to determine whether the packet is a good packet, i.e., whether the packet is uncorrupted. The analysis prevents false shut offs for situations that could cause the source address to be corrupted, e.g. in the case of a noise hit on the data in the source address field. If the data is uncorrupted, as can be verified by the received FCS field, the port is shut off after the one packet. Alternatively, a predetermined number of packets can be analyzed before shutting off a port. For example, it may be advisable to determine if a mismatch for multiple packets is being caused by the same source address or if the source address is changing to cause the mismatches. By way of example, a source address may continually change when a more sophisticated attempt is being made by an unauthorized source to enter a network. Allowing analysis of multiple packets better assists in identifying such situations.

The port shut off occurs as PORT_ENA goes low following the setting of the flip-flop 130 to a low level when the signal IC pulses low. The ENA signal, a normally low signal, should be pulsed high to re-enable the port. Circumstances for re-enabling a port are user dependent.

The deassertion of the IC signal is further suitable for use as an interrupt signal. Software control upon receipt of the interrupt signal is typically dependent on individual design needs. As an example, a control sequence executed upon receipt of an interrupt signal could be used in a count circuit until a predetermined number of mismatches have occurred. As mentioned above, using an extended count mechanism allows a determination to be made as to whether the same source address is causing the mismatch or if the source address is continuously changing to cause the mismatch. Such interrupt control circuitry will be well understood by those skilled in the art.

Although the present invention has been described in accordance with the embodiments shown in the figures, one of ordinary skill in the art recognizes there could be variations to the embodiments and those variations would be within the spirit and scope of the present invention.

For example, a plurality of stored addresses may be added to one or more of the repeater ports, each of the stored addresses representing a permitted/authorized address. An incoming source address could then be compared with the plurality of stored addresses. When a received source address fails to match any of the authorized addresses, the port would be disabled. A suitable system for mapping multiple addresses is described in co-pending U.S. patent application Ser. No. 08/366,809, entitled "Programmable Source Address Mapping Matrix for Secure Repeaters", filed Dec. 30, 1994, and assigned to the assignee of the present invention.

Accordingly, many modifications may be made by one of ordinary skills in the art without departing from the spirit and scope of present invention, the scope of which is defined solely by the appended claims.

What is claimed is:

1. A method for securing a local area network, the local area network having a plurality of nodes, a plurality of end stations, each end station having an end station address, and a repeater, the repeater having a plurality of ports, the method comprising:

(a) receiving a data packet, the data packet including a source address;

(b) utilizing a plurality of intruder control circuits, with one intruder control circuit per port of the repeater, for comparing the source address to at least one of the plurality of end station addresses; and (c) disabling, on an individual basis via the plurality of intruder control circuits, each of the plurality of ports on the repeater based on the comparison between the source address and at least one of the plurality of end station addresses.

2. A method as recited in claim 1 in which the disabling step (c) further comprises the step (c1) disabling the port to disable reception of the data packet at the port when the source address does not match the at least one end station address.

3. The method as recited in claim 2 in which the disabling step (c) further comprises the step of (c2) disabling the re-transmission of the data packet from any other ports when the source address does not match the at least one end station address.

4. The method as recited in claim 3 in which the disabling step (c) further comprises the step (C3) of corrupting the re-transmission of the data packet from any other ports when the source address does not match the at least one end station address.

5. A method as recited in claim 1 wherein the disabling step (c) further comprises the step of determining if the data packet is uncorrupted.

6. A method as recited in claim 5 in which the disabling step (c) further comprises the step of disabling the port when the source address does not match the at least one end station address after reception of a predetermined number of data packets if the data packet is uncorrupted.

7. A method as recited in claim 6 wherein the predetermined number of data packets is one.

8. A method as recited in claim 1 further comprising the step of providing an interrupt signal when the port is disabled.

9. An apparatus for securing a local area network having a plurality of nodes and end stations, each end station having an end station address, the apparatus comprising:

a controller means;

a memory comparison means coupled to the controller means for storing the end station addresses and performing a comparison on at least one of the stored end station addresses and a source address of a data packet; and a plurality of intrusion control means coupled to the memory comparison means and the controller means, each one of the plurality of intrusion control means coupled to one of a plurality of ports for disabling each port on a port-by-port basis based upon a comparison between the source address and the stored end station addresses.

10. An apparatus as recited in claim 9 in which the intrusion control means further determines if a data packet is uncorrupted.

11. An apparatus as recited in claim 10 wherein the memory comparison means comprises a memory comparator circuit CAM.

12. An apparatus as recited in claim 10 wherein the intrusion control means disables a port after reception of a predetermined number of data packets if the data packet is uncorrupted.

13. An apparatus as recited in claim 12 in which the predetermined number is one.

14. An apparatus as recited in claim 9 wherein the intrusion control means further comprises an address control means.

15. An apparatus as recited in claim 14 wherein the address control means latches a signal for each end station address into the intrusion control means.

16. An apparatus as recited in claim 15 wherein the latched signal indicates whether intrusion control is enabled for each end station address.

17. An apparatus as recited in claim 9 wherein the intrusion control means further outputs an interrupt signal.

18. An apparatus as recited in claim 9 wherein the intrusion control means disables reception of the data packet by the port when the source address does not match at least one of the end station addresses.

19. The apparatus as recited in claim 18 wherein the intrusion control means corrupts re-transmission of the data product from any other port.

20. The apparatus as recited in claim 18 wherein the intrusion control means disables re-transmission of the data packet from any other port when the source address does not match at least one of the end station addresses.

21. A system for securing a local area network having a plurality of nodes and a plurality of end stations, each end station having an end station address, the system comprising:

a memory comparator means for storing a plurality of end station addresses and comparing the end station addresses to a source address of a data packet, the memory comparator means having a preferred source address register means and a last source address register means; and a plurality of intrusion control means coupled to the memory comparator means, each one of the plurality of intrusion control means coupled to one of a plurality of ports for disabling each port on a port-by-port basis when the source address does not match the stored end station addresses.

22. A system as recited in claim 21 in which the preferred source address register means and last source address register means each store an end station address for each node in the network.

23. A system as recited in claim 22 wherein the source address of an intruder data packet is stored in the last source address register means.

24. A system as recited in claim 23 in which the preferred source address register means stores a predetermined end station address.

25. A system as recited in claim 22 in which the memory comparator means stores a plurality of preferred source addresses for each node in the network.

26. A system as recited in claim 21 further comprising means for re-enabling the port.

27. An intrusion control system for a secure repeater, the repeater having a plurality of ports and used in a network to route data packets between end stations, each data packet having a destination address and a source address, the system comprising:

means for storing one or more preferred source addresses for the plurality of ports in the repeater;

means for comparing a source address of an incoming data packet received at a first port of the plurality of ports to the stored preferred source addresses;

means for indicating detection of a predetermined number of mismatches between the stored preferred source addresses and the incoming source address;

means for individually disabling the reception by the first port after detection of the predetermined number of mismatches; and means for storing the incoming source address causing the predetermined number of mismatches.

28. The system of claim 27 in which the predetermined number of mismatches is one.

29. The system of claim 27 in which the re-transmitted data from the plurality of ports is corrupted.

30. A system for securing a local area network having a plurality of nodes and a plurality of end stations, each end station having an end station address, the system comprising:

a memory comparator means for storing a plurality of end station addresses and comparing the end station addresses to a source address of a data packet, the memory comparator means having a preferred source address register means and a last source address register means, the preferred source address register means and last source address register means being programmable; and a plurality of intrusion control means coupled to the memory comparator means, each one of the plurality of intrusion control means coupled to one of a plurality of ports for disabling each port on a port-by-port basis when the source address does not match the stored end station addresses.

31. The system of claim 30 in which the re-transmitted data to the plurality of nodes is corrupted.

32. The system of claim 30 in which each of the plurality of intrusion control means further comprises:

a plurality of input latches with at least two latches for receiving an input signal from the memory comparator means indicative of a result of the comparison;

a plurality of logic gates coupled to the input latches for logically combining data from the input latches; and an output latch coupled to the logic gates for outputting a signal to disable a port.

* * * * *